(12) United States Patent
Watabe et al.

(10) Patent No.: US 9,170,360 B2
(45) Date of Patent: Oct. 27, 2015

(54) DISPLAY DEVICE

(71) Applicant: Japan Display Inc., Tokyo (JP)

(72) Inventors: Kazufumi Watabe, Yotsukaido (JP); Masayuki Mifune, Mobara (JP)

(73) Assignee: JAPAN DISPLAY INC., Tokyo (JP)

( * ) Notice: Subject to any disclaimer, the term of this patent is extended or adjusted under 35 U.S.C. 154(b) by 99 days.

(21) Appl. No.: 13/952,878

(22) Filed: Jul. 29, 2013

(65) Prior Publication Data

US 2014/0029297 A1    Jan. 30, 2014

(30) Foreign Application Priority Data

Jul. 30, 2012  (JP) ................................ 2012-168119

(51) Int. Cl.
*G02B 6/00* (2006.01)
*F21V 8/00* (2006.01)

(52) U.S. Cl.
CPC ............ *G02B 6/0016* (2013.01); *G02B 6/0021* (2013.01); *G02B 6/0068* (2013.01)

(58) Field of Classification Search
CPC ... G02B 6/0021; G02B 6/0016; G02B 6/0026
USPC .......................... 362/621, 628, 612, 613, 625
See application file for complete search history.

(56) References Cited

U.S. PATENT DOCUMENTS

| | | | |
|---|---|---|---|
| 6,976,779 B2 * | 12/2005 | Ohtsuki et al. ................ | 362/608 |
| 2007/0091640 A1 * | 4/2007 | Kim et al. ..................... | 362/612 |
| 2008/0278659 A1 * | 11/2008 | Park ............................... | 349/65 |
| 2009/0225530 A1 | 9/2009 | Naijo et al. | |
| 2010/0172155 A1 * | 7/2010 | Kim et al. ..................... | 362/621 |
| 2012/0050149 A1 * | 3/2012 | Ro et al. ....................... | 345/102 |
| 2012/0300494 A1 * | 11/2012 | Watabe et al. ................ | 362/602 |
| 2014/0176874 A1 * | 6/2014 | Shinohara et al. ............. | 349/65 |

FOREIGN PATENT DOCUMENTS

| | | |
|---|---|---|
| JP | 2002-169034 | 6/2002 |
| JP | 2005-63913 | 3/2005 |
| JP | 2007-200876 | 8/2007 |

* cited by examiner

*Primary Examiner* — Julie Bannan
(74) *Attorney, Agent, or Firm* — Lowe Hauptman & Ham, LLP

(57) ABSTRACT

A display device includes a side light type backlight for white color display by single color LEDs, an LED set is placed in a concave portion of a light guide plate, in which a first color LED is located in the center and a second or third color LED is located on the side of the first color LED. An incident slit with an arc shaped convex portion is formed facing the first color LED, and a saw tooth slit with a right-angled triangular concave portion is formed facing the second or third color LED. This allows directing the distribution axes of the lights from the second and third color LEDs to the center side, and adjusting orientation angles to allow effective mixing of the three color lights, in order to increase the white color area and effective display area.

10 Claims, 9 Drawing Sheets

DISPLAY DEVICE

CLAIM OF PRIORITY

The present application claims priority from Japanese Patent Application JP 2012-168119 filed on Jul. 30, 2012, the content of which is hereby incorporated by reference into this application.

FIELD OF THE INVENTION

The present invention relates to a display device, and more particularly, to a display device of side light type capable of reducing the area of color variation by using a plurality of single color LEDs in order to increase the effective display area.

BACKGROUND OF THE INVENTION

One example of the display device is a liquid crystal display device including a TFT substrate in which pixel electrodes, thin film transistors (TFTs) and the like, are arranged in a matrix form. Then, a counter substrate is disposed opposite to the TFT substrate, in which color filters, and the like, are formed at locations corresponding to the pixel electrodes of the TFT substrate. Further, a liquid crystal layer is interposed between the TFT substrate and the counter substrate. In such a liquid crystal display device, the transmittance of light is controlled by liquid crystal molecules for each pixel to form an image.

The liquid crystal display device can be made thin and light weight, and is used in a wide range of applications. The liquid crystal does not emit light by itself, so that a backlight is provided on the back of the liquid crystal display panel. In small liquid crystal display devices, LED is used as a light source. Further, in the small liquid crystal display device, the so-called side light type backlight in which LEDs are located on a side of the light guide plate is used to reduce the thickness of the entire device.

Although the LED is a point light source, it is necessary that the light emitted from the light guide plate is an area light source. However, the light intensity greatly varies around the light guide plate in which the LEDs are located, so that it is not appropriate to use such a light guide plate as the area light source. Thus, the region that can be used as the area light source is limited. In order to increase the area that can be used as the area light source, Japanese Application Laid-Open No. 2002-169034 and Japanese Application Laid-Open No. 2005-63913 describe a configuration in which a trapezoidal projection is formed on a side of the light guide plate, and the LED as the light source is mounted on the upper bottom portion of the trapezoidal projection to obtain a uniform light emitted from the light guide plate. The backlight described in Japanese Application Laid-Open Nos. 2002-169034 and 2005-63913 uses the white LED as the light source. For this reason, the problem of color variation does not occur.

Japanese Application Laid-Open No. 2007-200876 describes a configuration in which a large number of LED sets of red-emitting LED (hereinafter referred to as red LED), green-emitting LED (hereinafter referred to as green LED), and blue-emitting LED (hereinafter referred to as blue LED) are used in the so-called direct-type backlight, in order to obtain an area light source of white color. Each LED set is mounted in a light guide part having a convex portion with a T-shaped cross section, in which a concave portion is formed on the opposite side of the convex portion. In the LED set, three color LEDs are arranged in a delta pattern in the convex portion of the light guide part. In this way, the three colors are mixed together in the light guide part.

SUMMARY OF THE INVENTION

In general, a color filter is used for color display in the display device such as the liquid crystal display device. In this case, the backlight is white light. In the color filter method, for example, the red is displayed by blocking the light such as green and blue by a filter, using only one third of the energy of the light of the backlight. Thus, the energy efficiency is low. This is the same for the green and blue displays or other color displays.

On the other hand, the so-called field sequential driving method does not use the color filter, so that the energy efficiency of the backlight is high. FIG. 12 is a schematic view of the principle of the field sequential method. It is assumed that a flower in pot 500 shown in FIG. 12 includes red, green, and blue colors. First only a flower 501, which is red, is displayed for a predetermined period of time. At this time, only the red LED is lit. Next only a stem and leave 502, which is green, is displayed for a predetermined period of time. At this time, only the green LED is lit. Further, only a pot 503, which is blue, is displayed for another predetermined period of time. At this time, only the blue LED is lit. It is recognized as the image 500 in which three colors are combined because the human eye has persistence of vision.

As described above, the field sequential system does not use the color filter, so that it is possible to use all the light from the light source for display. However, in principle, the white light may not be used in field sequential mode. It is necessary to light the single color LEDs of red, green, and blue in different time intervals. Even if these single color LEDs are operated in different time intervals, these lights are viewed by the human eye as if they overlapped. For this reason, it is recognized in the white display as a color variation if the mixing of the three color LEDs is not sufficient in the display area.

FIG. 13 is a perspective view of a part of the backlight of the field sequential method in a conventional example. In FIG. 13, a plurality of LED sets 20 facing each other are mounted in an LED flexible wiring substrate 120 on a side surface of a light guide plate 10. A reflective sheet 30 is provided on the lower surface of the light guide plate 10. The LED set 20 is, as shown in FIG. 11, an LED package in which a red LED 20R, a green LED 20G, and a blue LED 20B are contained.

FIG. 14 is a plan view of the arrangement of the light guide plate 10 and the LED set 20. FIG. 14 shows a plan view of the end portion of the light guide plate 10. In FIG. 14, the LED flexible wiring substrate 120 is omitted. In FIG. 14, a rectangular concave portion 12 is formed in the light guide plate 10, and the LED set 20 is provided within the concave portion 12. In the concave portion 12 of the light guide plate 10, an incident slit 13 is formed on the surface facing the LED set 20 to spread the light from the LED. The existing structure of the incident slit 13 will be described later.

The red LED 20R, the green LED 20G, and the blue LED 20B are located in the LED set 20 at a position facing the incident light silt 13 of the light guide plate 10. The light incident in the incident slit 13 from each single color LED is spread by the incident slit 13 and travels to the portion corresponding to a display area 400 of the liquid crystal display panel. In the display area 400, the lights of the three colors should be sufficiently mixed to allow for the white display. However, as shown in FIG. 14, the single color area or twocolor area is present in the vicinity of the LED set 20, so that the part of this area may not be used as the display area 400.

In FIG. 14, of the light emitted from the incident slit 13, R is a single red area, G is a single green area, and B is a single blue area. Further, Y is a yellow area in which red and green are mixed, C is a cyan area in which blue and green are mixed, and W is a white area in which the three colors of red, green, and blue are mixed. The red area and the yellow area are reflected by the end portion of the light guide plate to the display area. After reflection, the red area is mixed with the green and blue lights and the yellow area is mixed with the blue light, so that white light is created. Thus, the area that can be used as the display area 400 is above the dashed line in FIG. 14. On the other hand, the area of the single color light or two-mixed color light is a non-display area 450 which may not be used as the display area.

FIG. 15 is a view of an incident slit 15 with an arc shaped convex portion facing the LED set 20. The purpose of forming the arc shaped incident slit is to spread the light right and left to increase the mixing area of three colors as much as possible. However, in the case of the incident slit 15 with the arc shaped convex portion, as shown in FIG. 15, a light distribution axis 25 from the LED set runs straight in the direction perpendicular to the light emitting surface. Here, the light distribution axis is the central axis in the direction in which the light from the LED is incident to the light guide plate 10 and propagates. Thus, in the conventional example, the area in which the three color lights are mixed requires a relatively long distance from the LED set.

In order to increase the space efficiency of the display device, it is necessary to reduce the non-display area 450. However, there is a limit to reduce the non-display area 450 by the incident slit with the arc shaped convex portion in the conventional example shown in FIG. 15. The purpose of the present invention is to achieve a backlight capable of increasing the area in which white light is created, as much as possible, in a display device for displaying an image by using single color LEDs of read LED, green LED, and blue LED based on the field-sequential method and the like. Note that these red LED, green LED, and blue LED are used as an example, and the purpose is the same, for example, when yellow LED is added.

The present invention is to solve the above problem and the main aspects are as follows.

(1) A display device includes a display panel having a TFT substrate and a counter substrate with a backlight provided in the back of the display panel. The backlight is a side-light type including a light guide plate and a light source which is mounted on a side of the light guide plate. The light source is an LED set in which a first color LED is located in the center, a second color LED is located on one side of the first color LED, and a third color LED is located on the other side of the first color LED. A concave portion is formed to place the LED set in the light guide plate. Incident slits with symmetrical shapes are formed in the concave portion of the light guide plate at a position facing the first color LED. Further, saw tooth slits with asymmetrical shapes are formed in the concave portion of the light guide plate at a position facing the second color LED and the third color LED.

(2) In the display device described in (1), the symmetrical incident slit formed facing the first color LED has an arc shaped convex portion. The asymmetrical saw tooth slit formed facing the second color LED or the third color LED has a triangular concave portion. The triangular concave portion is a triangle in which the outer side is short and the inner side is long.

According to the present invention, in a liquid crystal display device capable of white color display using a plurality of single color LEDs, it is possible to increase the area of the display area while the overall size remains unchanged. The present invention is particularly effective for liquid crystal display devices of the field sequential method that require the use of single color LED.

DETAILED DESCRIPTION OF THE PREFERRED EMBODIMENTS

Hereinafter, the present invention will be described in detail with reference to the preferred embodiments.

First Embodiment

Figure 1:
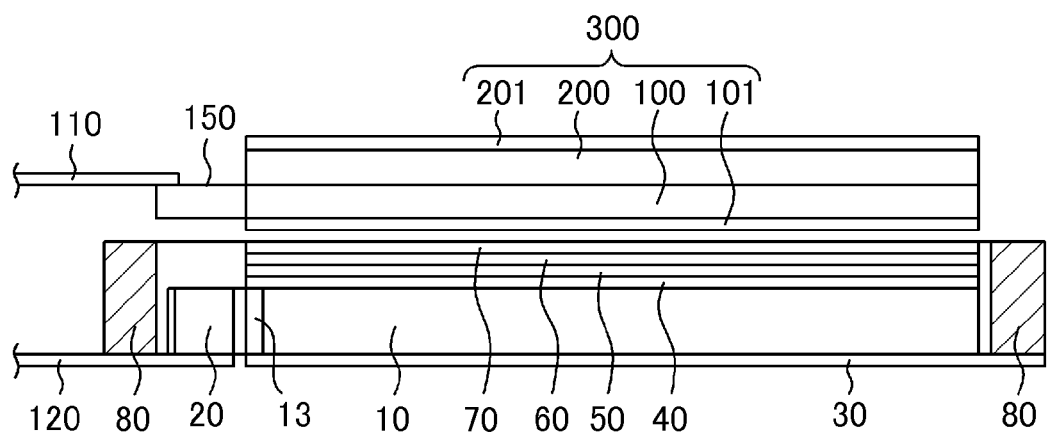
FIG. 1 is a cross-sectional view of a liquid crystal display device.

FIG. 1 is a cross-sectional view of a display device to which the present invention is applied. In the present embodiment, the description will focus on a liquid crystal display device as an example of the display device. In FIG. 1, a backlight is provided on the back of a liquid crystal display panel 300 (display panel). A TFT substrate 100 is a substrate in which TFTs and pixel electrodes are arranged in a matrix form. A liquid crystal layer not shown is interposed between the TFT substrate 100 and a counter substrate 200. A lower polarizing plate 101 is provided below the TFT substrate 100, and an upper polarizing plate 201 is provided on the counter substrate 200. Thus, the TFT substrate 100, the counter substrate 200, the lower polarizing plate 101, and the upper polarizing plate 201 constitute the liquid crystal display panel 300. The TFT substrate 100 is larger than the counter substrate 200. The area of the TFT substrate 100 not overlapping the counter substrate 200 is a terminal portion 150. A flexible wiring substrate 110 is connected to the terminal portion 150 to supply image signals and the like.

The backlight is placed in a resin mold 80. An LED set 20 is a light source, which is a set of a red LED 20R, a green LED 20G, and a blue LED 20B. The LED set 20 is provided in a concave portion formed on a side surface of the light guide plate 10. The LED set 20 is located in an LED flexible wiring substrate 120. An incident slit 13 is formed in the light guide plate 10 at a position facing the LED set 20 to spread the light from the LED. Then, a reflective sheet 30 is formed in the lower surface of the light guide plate 10.

There are optical sheets provided on the light guide plate 10. In FIG. 1, the optical sheets include a lower diffusion sheet 40, a lower prism sheet 50, an upper prism sheet 60, and an upper diffusion sheet 70 from the bottom of the light guide plate 10. The lower diffusion sheet 40 reduces uneven brightness due to the point light source that does not ensure uniform light distribution by the light guide plate 10. The lower prism sheet 50 has a function to direct the light, which is likely to be spread in a specific direction, to the direction of the liquid crystal display panel 300. The upper prism sheet 60 directs the light, which is likely to be spread at a right angle to a specific direction, to the direction of the liquid crystal display panel 300. The upper diffusion sheet 70 reduces moiré due to the scan line or image signal line of the liquid crystal display panel 300, and due to the lower prism sheet 50 or the upper prism sheet 60. The optical sheets in FIG. 1 are an example, and there are other combinations. For example, a plurality of diffusion sheets can be used instead of the prism sheets.

Figure 2:
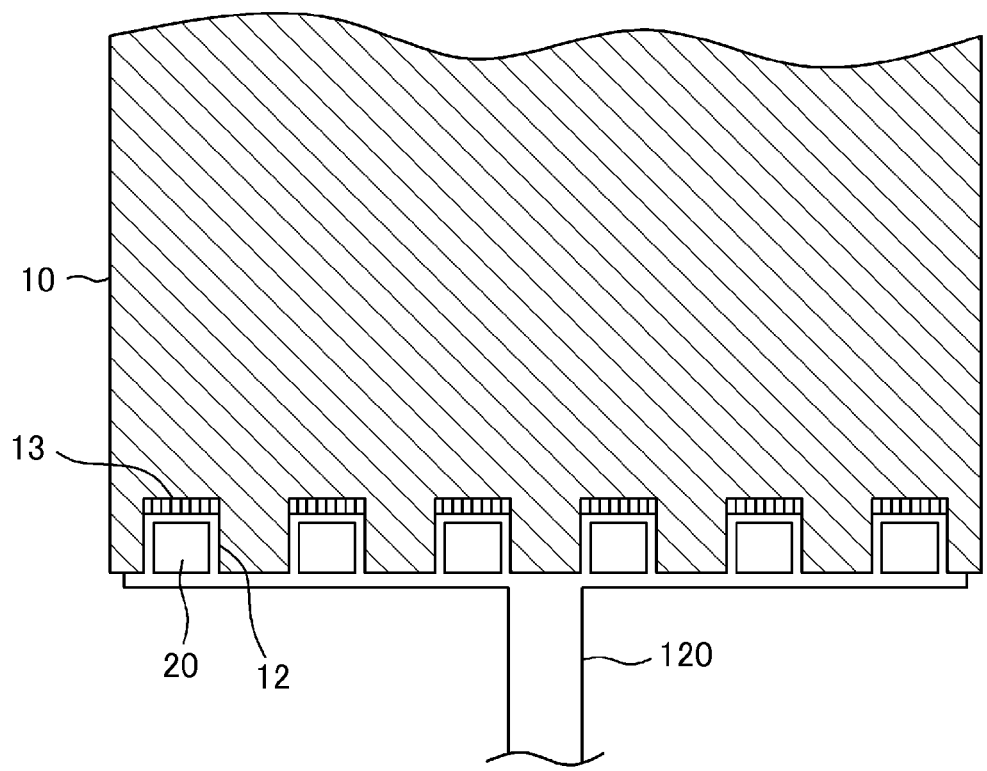
FIG. 2 is a plan view showing the state in which LED sets are placed in concave portions of a light guide plate.

FIG. 2 is a plan view of the light guide plate 10 with the LED set 20 provided therein. The LED set 20 is provided in the concave portion 12 of the light guide plate 10. In the concave portion 12 of the light guide plate 10, the incident slit 13 is formed at a position facing the LED set 20 in order to spread the light from the LED set 20. The feature of the present invention is the shape of the incident slit 13, which is designed to be able to effectively spread the light from the LED set 20 in order to increase the display area in which three colors are mixed.

Figure 3:
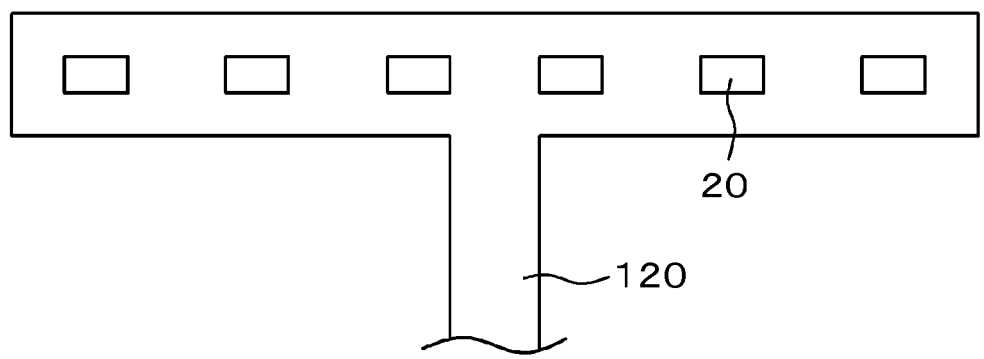
FIG. 3 is a plan view of an LED flexible wiring substrate in which the LED sets are mounted.

In FIG. 2, a plurality of LED sets 20 are arranged on the LED flexible wiring substrate 120. FIG. 3 is a plan view showing the state in which a plurality of LED sets 20 are provided in the LED flexible wiring substrate 120. In FIG. 3, the lines of the flexible wiring substrate 120 are omitted. There are six LED sets 20 in the T-shaped flexible wiring substrate 120.

Figure 4:
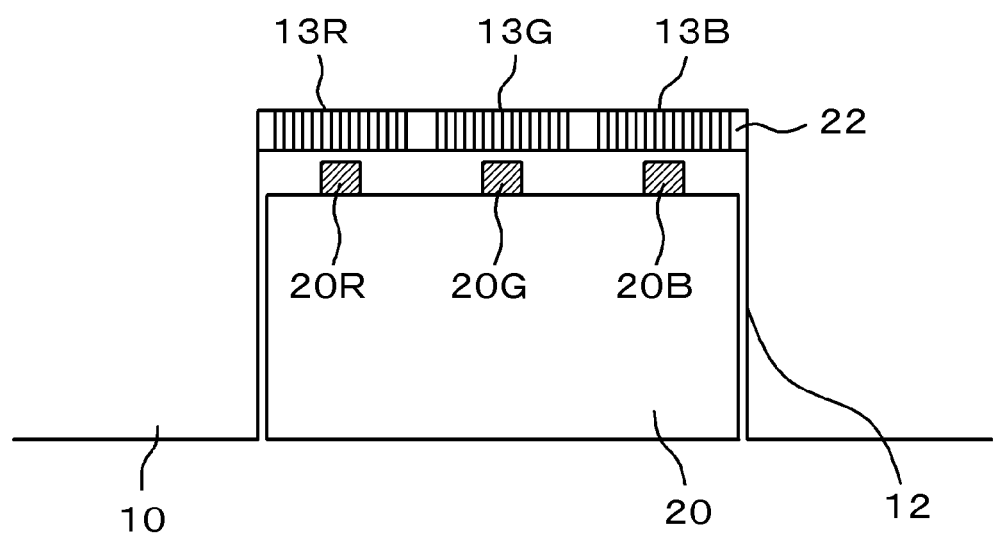
FIG. 4 is an enlarged plan view showing the state in which the LED set is placed in the concave portion of the light guide plate according to the present invention.

FIG. 4 is a plan view showing the state in which the red LED 20R, the green LED 20G, and the blue LED 20B are arranged on the front surface of the LED set 20, which is placed in the concave portion 12 of the light guide plate 10. In FIG. 4, the green LED 20G with the largest amount of light is located in the center of the LED set 20. In this way, it is possible to optimize the mixing balance to increase the luminous efficiency. Note that in the conventional example, the blue LED 20B, which is the smallest size, is located in the center of the LED set 20. In FIG. 4, an incident slit 13R for the red LED 20R, an incident slit 13 for the green LED 20G, and an incident slit 13B for the blue LED 20B are provided separately. However, it is also possible to arrange the incident slits in series.

Figure 5:
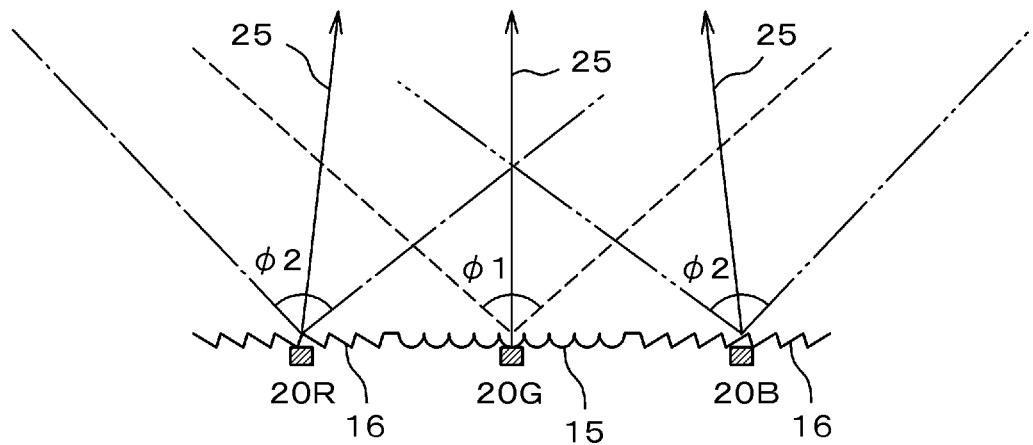
FIG. 5 is a schematic view of the incident slit, as well as the distribution axes and distribution angles of the lights in the light guide plate according to an embodiment of the present invention.

FIG. 5 is a schematic view of the planar shape of the incident slit 13, as well as the directions of the light emitted from the red LED 20R, the green LED 20G, and the blue LED 20B according to the present invention. In FIG. 5, the incident slit corresponding to the green LED 20G is an incident slit 15 with an arc shaped convex portion. The incident slit corresponding to the red LED 20R and the blue LED 20B is a saw tooth slit 16. The saw tooth slit 16 directs the light from the red LED 20R, as well as the light from the blue LED 20B to the central direction to allow for easy mixing with the light from the green LED 20G.

The light is incident to the incident slit 13 from the LED set 20 and spread within the light guide plate 10 from the incident slit 13. At this time, the central axis of the light is referred to as the distribution axis, and the spread of each light is referred to as the distribution angle. The distribution axes of the light emitted from the red LED 20R and the blue LED 20B run in the central direction by the saw tooth slit 16. The distribution angle φ1 of the light that is emitted from the green LED 20G and spread by the incident split 15 with an arc shaped convex portion, and the distribution angle φ2 of the light that is emitted from the red LED 20R or the blue LED 20B and spread by the saw tooth slit 16, are substantially the same in the present embodiment. However, the distribution angles can be adjusted by each of the slit shapes. Note that both distribution angles φ1 and φ2 are up to about 120 degrees.

Figure 6:
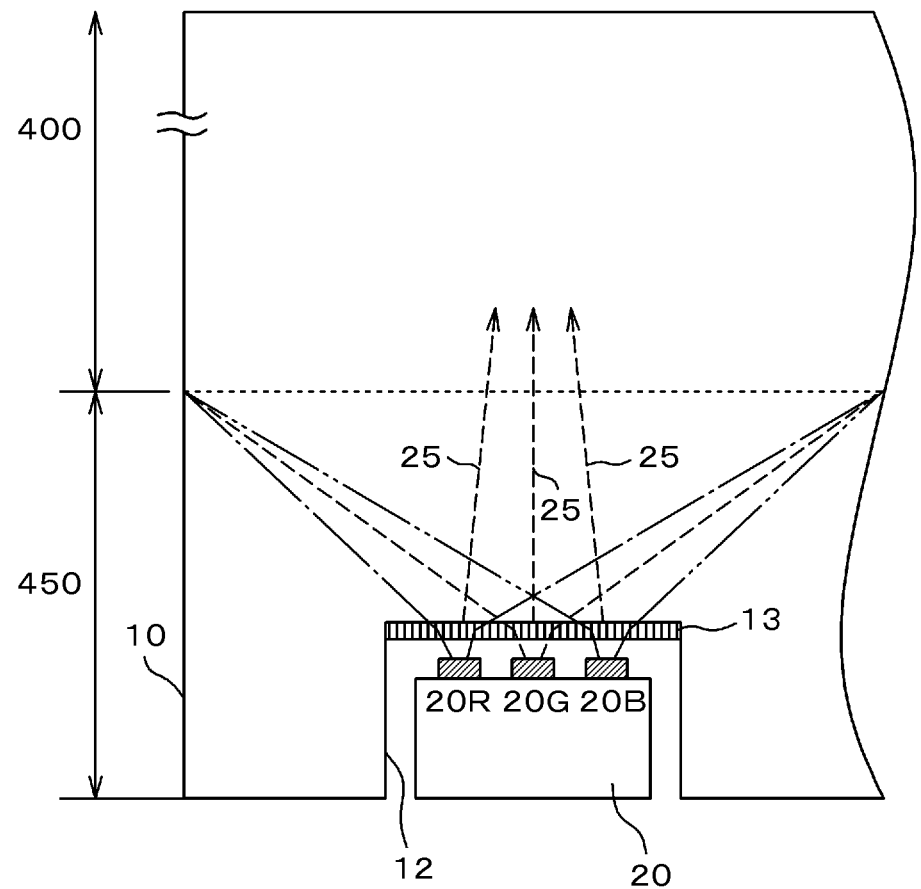
FIG. 6 is a schematic view of the distribution axes and distribution angles of the lights from a green LED, red LED, and a blue LED within the light guide plate according to the embodiment of the present invention.

Thus, as shown in FIG. 6, the distance required for mixing of the three color lights is reduced by the inclination of the distribution axes of the red light and the blue light. As a result, the white color area in the light guide plate 10 is increased. Thus, it is possible to increase the display area.

Figure 7:
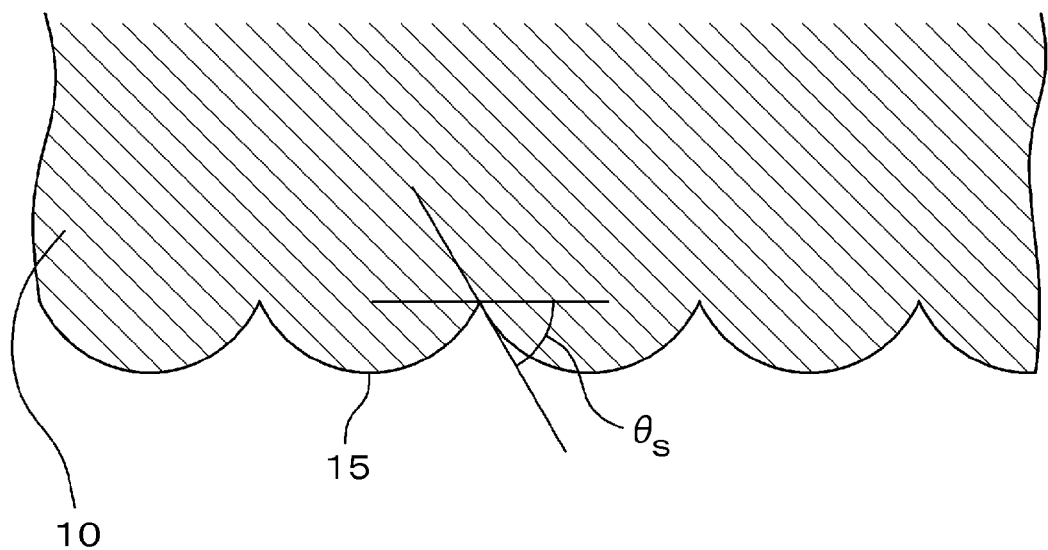
FIG. 7 is a plan view of the incident slit having an arc shaped convex portion formed at a position corresponding to the green LED.

FIG. 7 is a view of the planar shape of the incident slit 15 with an arc shaped convex portion in which the light from the green LED 20G is incident. The distribution angle shows the spread of the light in the light guide plate 10 by the incident split 15 with an arc shaped convex portion. The distribution angle can be controlled by the contact angle θs shown in FIG. 7. In general, the contact angle θs is between 70 to 90 degrees, and the greater the contact angle the greater the spread of the light. The maximum value of the contact angle θs is 90 degrees. In this case also, the distribution angle is about 120 degrees.

Figure 8:
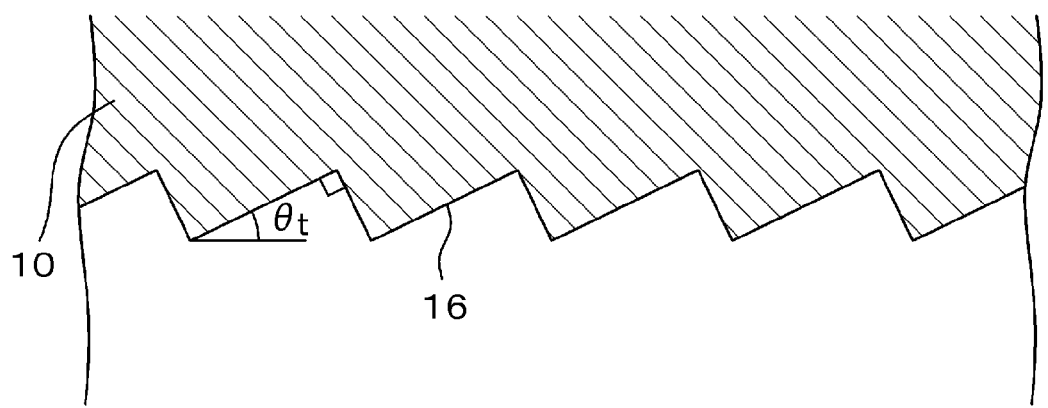
FIG. 8 is an example of the saw tooth slit.

FIG. 8 is a plan view of the shape of the saw tooth slit 16 for the light from the blue LED 20B. In FIG. 8, the concave portion of the saw tooth slit 16 is a right-angled triangle with the right angle at the top. The minimum angle θt of the right-angled triangle is 35 degrees in FIG. 8. Note that the top of the triangle may not be the correct right angle. It is possible to adjust the distribution axis and the distribution angle from the incident slit 13 by controlling the minimum angle θt and the angle of the top of the triangle. FIG. 8 shows the shape of the saw tooth slit 16 in which the light from the blue LED 20B is incident. The shape of the saw tooth slit 16 in which the light from the red LED 20R is incident is symmetrical to the shape of the saw tooth slit 16 shown in FIG. 8.

Figure 9:
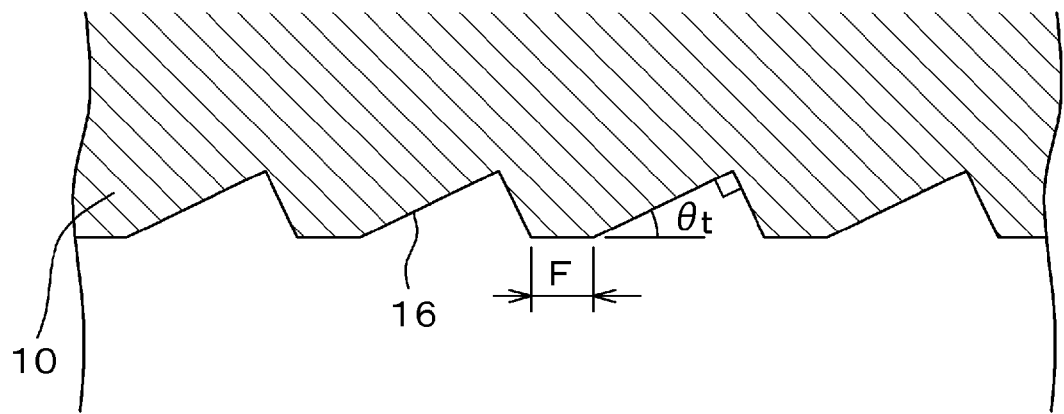
FIG. 9 is another example of the saw tooth slit.

FIG. 9 is a plan view of another example of the saw tooth slit 16. In FIG. 19, the concave portions of right-angled triangle are not arranged in series, and there is a flat portion F between the concave portions. In other words, the concave portions of right-angled triangle are periodically formed with the flat portion between them. In this case also, the top of the triangle may not be the correct right angle. Similar to FIG. 8, it is possible to control the light distribution axis and the light distribution angle in the light guide plate 10 by the minimum angle θt and the angle of the top of the triangle of the concave portion.

Figure 10:
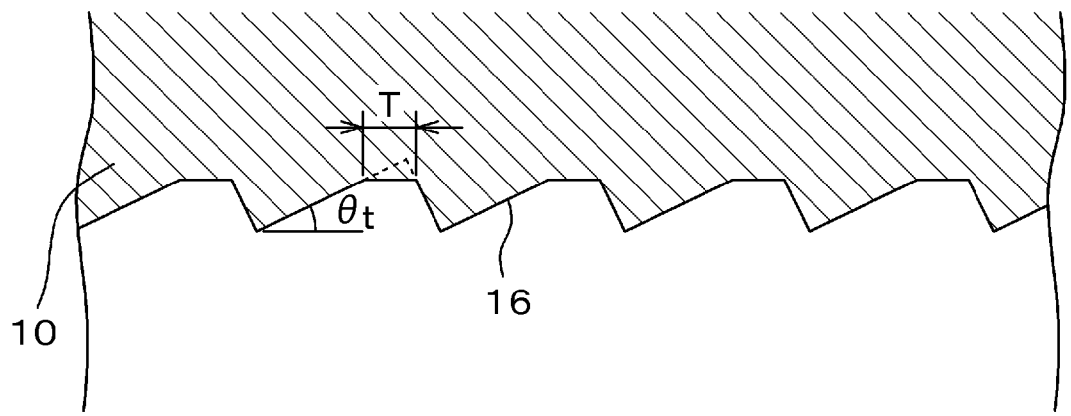
FIG. 10 is still another example of the saw tooth slit.

FIG. 10 is a plan view of still another example of the saw tooth slit 16. In FIG. 10, the portion corresponding to the right angle of the right-angled triangle of the saw tooth slit 16 has a flat portion with a length of T. Even in such a shape, it is possible to control the distribution axis and distribution angle in the light guide plate 10 with respect to the angle from the blue LED 20B. FIG. 10 is an example of the saw tooth slit 16 for the blue LED 20B. The shape of the saw tooth slit 16 for the red LED 20R is symmetrical to the shape of the saw tooth slit 16 shown in FIG. 10.

As described above, the incident slit 13 according to the present embodiment is configured such that the symmetrical incident slit 15 with an arc shaped convex portion is formed for the green LED 20G in the center, and the asymmetrical saw tooth slit 16 is formed for the red LED 20R or the blue LED 20B in the side of the green LED 20G. With this configuration, it is possible to increase the white color area in which the three colors are mixed.

Second Embodiment

Figure 11:
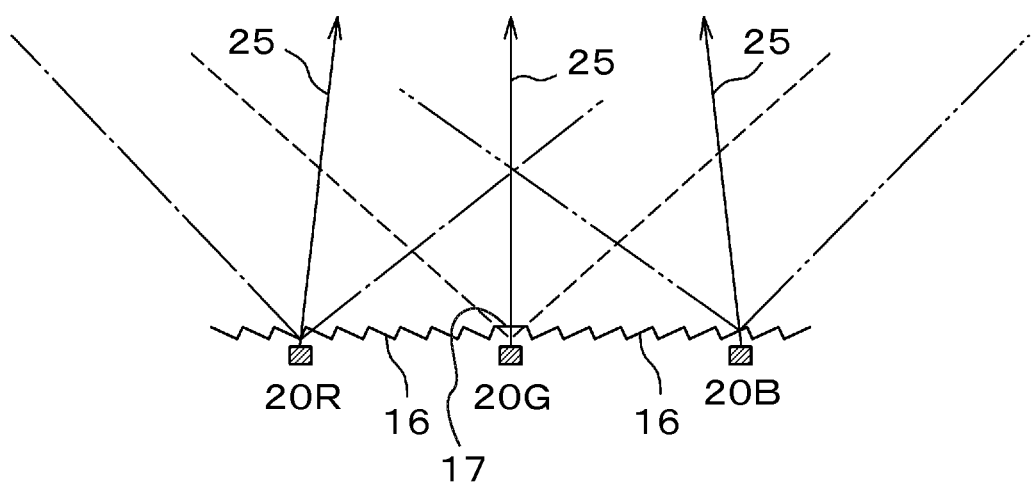
FIG. 11 is a schematic view of another slit, as well as the distribution axes and distribution angles of the lights in the light guide plate according to the embodiment of the present invention.
Figure 12:
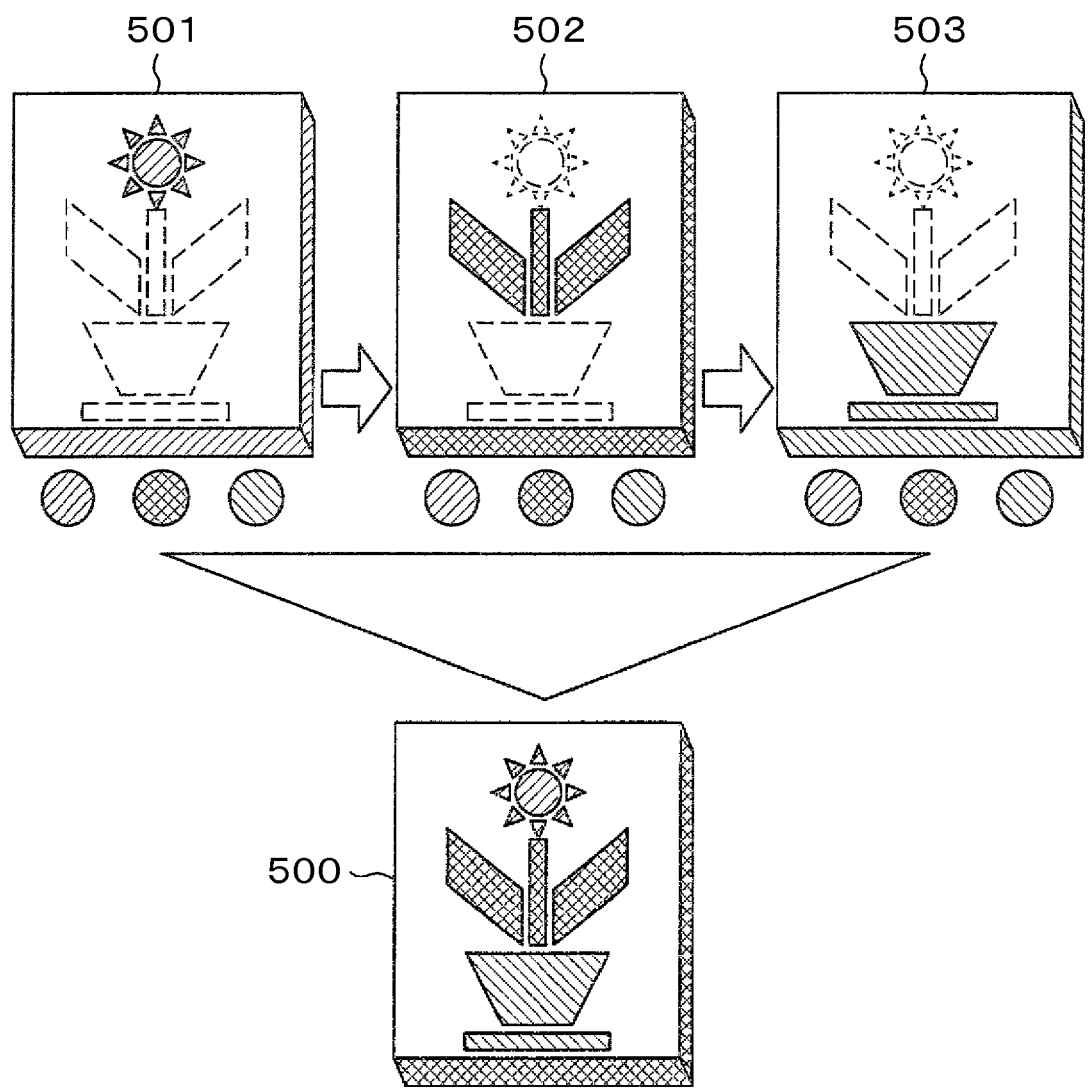
FIG. 12 is a schematic view of the principle of the field sequential method.
Figure 13:
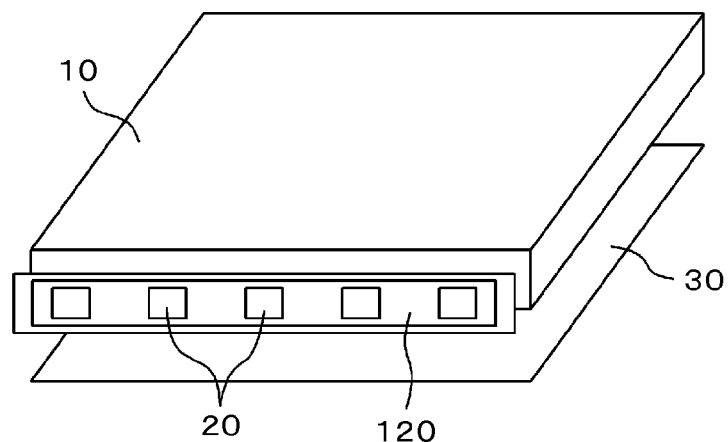
FIG. 13 is a perspective view of the structure of a side light type backlight.
Figure 14:
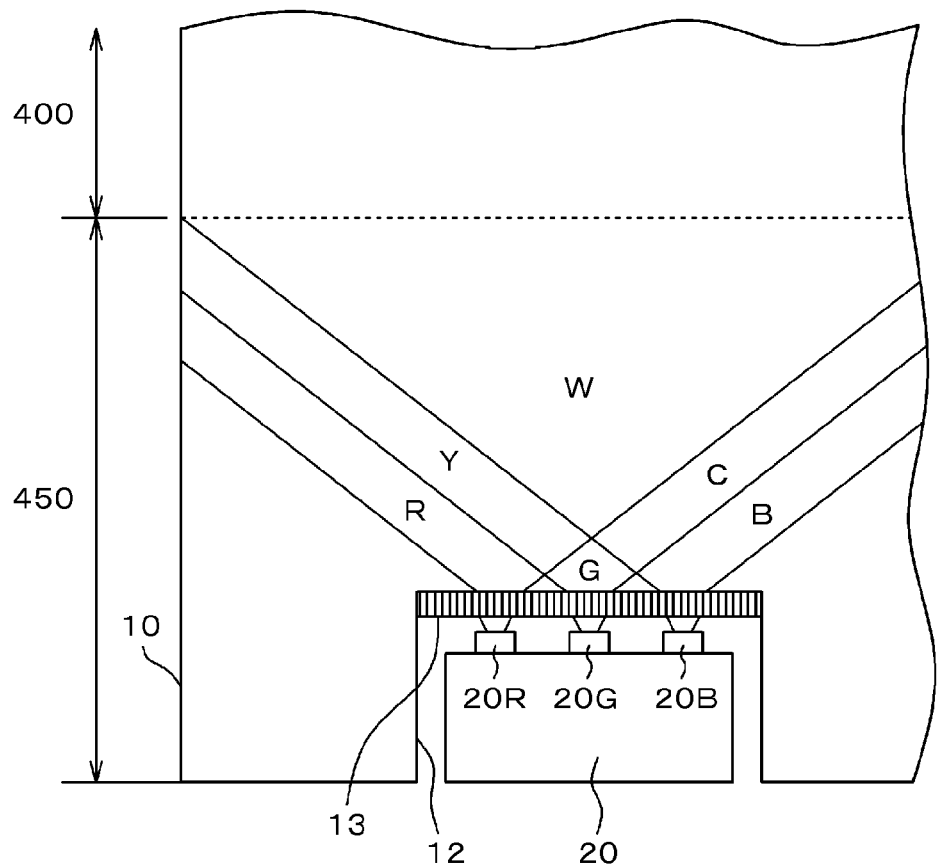
FIG. 14 is a schematic view of the state of mixing of the lights within the light guide plate according to the conventional example.
Figure 15:
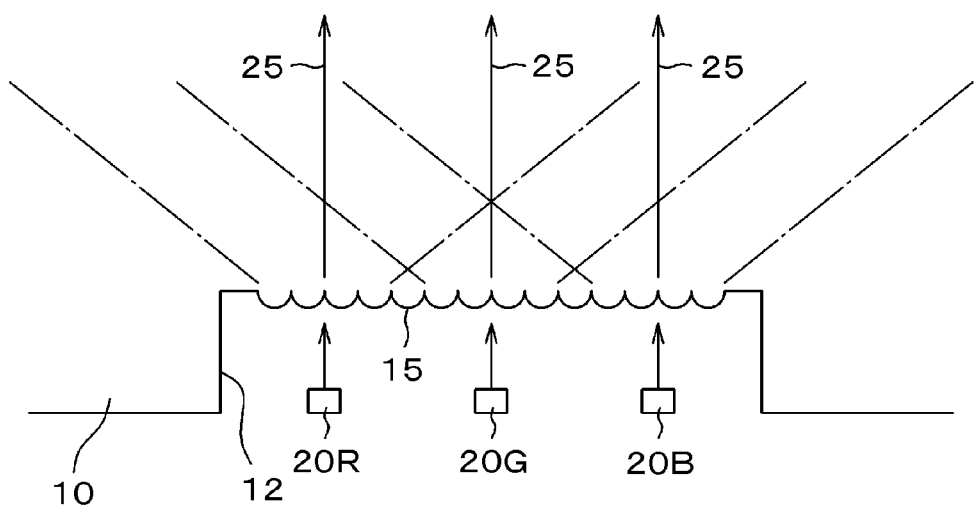
FIG. 15 is a plan view of the incident slit formed in the light guide plate and a schematic view of the distribution axes and distribution angles of the lights from the respective LED sets, according to the conventional example.

FIG. 11 is a view of the planar shape of the incident slit 13 according to a second embodiment of the present invention. FIG. 11 is different from FIG. 5 of the first embodiment in that the incident slit 13 corresponding to the light from the green LED 20G is not the incident slit 15 with an arc shaped convex portion, but is an incident slit 17 with a trapezoidal concave portion. In this case also, it is possible to control the distribution axis and the distribution angle in the light guide plate 10 with respect to the light from the green LED 20G. In FIG. 11, there is one trapezoidal concave portion. However, a plurality of trapezoidal concave portions can also be provided.

In FIG. 11, similar to the first embodiment, the incident slit 13 at the positions in which the light from the red LED 20R and the light from the blue LED 20B are incident, is configured as the saw tooth slit 16. In this case also, the saw tooth slit 16 may not have the perfect saw-tooth shape as shown in FIG. 8. As described in the first embodiment, by using the saw tooth slit 16 shown in FIG. 9 or FIG. 10, it is possible to control the distribution axis and the distribution angle in the light guide plate 10 with respect to the light from the red LED 20R and the light from the blue LED 20B.

As describe above, also in the present embodiment, the incident slit 13 is configured such that the symmetrical incident slit 17 with a trapezoidal concave portion is formed for the green LED 20G in the center, and the asymmetrical saw tooth slit 16 is formed for the red LED 20R or the blue LED 20B in the side of the green LED 20G. With this configuration, it is possible to increase the white color area in which the three colors are mixed.

The light source of the backlight described in the first and second embodiments allows for effective mixing of the lights from the three color LEDs in order to increase the area in which white color is created. Thus, it is particularly effective in the display device of the field sequential method.

What is claimed is:

1. A display device comprising a display panel including a TFT substrate and a counter substrate with a backlight provided in a back of the display panel,
    wherein the backlight is a side-light type including a light guide plate and a light source which is mounted on a side of the light guide plate,
    wherein the light source is an LED set in which a first color LED is located in the center, a second color LED is located on one side of the first color LED, and a third color LED is located on the other side of the first color LED,
    wherein a concave portion is formed to place the LED set in the light guide plate,
    wherein incident slits with symmetrical shapes are formed in the concave portion of the light guide plate at a position facing the first color LED,
    wherein saw tooth slits with asymmetrical shapes are formed in the concave portion of the light guide plate at a position facing the second color LED and the third color LED,
    wherein the incident slits formed facing the first color LED have arc shaped convex portions,
    wherein the saw tooth slits facing the second color LED and the third color LED have triangular concave portions, and
    wherein each of the triangular concave portions is a triangle in which an outer side is short and an inner side is long.

2. The display device according to claim 1, wherein the each of the triangular concave portions is a right-angled triangle.

3. The display device according to claim 2, wherein the triangular concave portions are periodically formed with a flat portion between them.

4. The display device according to claim 1,
    wherein each of the incident slits formed facing the first color LED is a slit with a trapezoidal concave portion,
    wherein each of the saw tooth slits formed facing the second color LED or the third color LED has a triangular concave portion, and
    wherein the triangular concave portion is a triangle in which an outer side is short and an inner side is long.

5. The display device according to claim 1, wherein the first color is green.

6. The display device according to claim 1, wherein when a white color is displayed, a brightness of the first color LED is higher than a brightness of the second color LED and higher than a brightness of the third color LED.

7. A display device comprising a display panel including a TFT substrate and a counter substrate with a backlight provided in a back of the display panel,
    wherein the backlight is a side-light type including a light guide plate and a light source which is mounted on a side of the light guide plate,
    wherein the light source is an LED set in which a green LED is located in the center, a red LED is located on one side of the green LED, and a blue LED is located on the other side of the green LED,
    wherein a concave portion is formed to place the LED set in the light guide plate,
    wherein incident slits with symmetrical shapes are formed in the concave portion of the light guide plate at a position facing the green LED,
    wherein saw tooth slits with asymmetrical shapes are formed in the concave portion of the light guide plate at a position facing the red LED and the blue LED,
    wherein the incident slits have arc shaped convex portions,
    wherein the saw tooth slits have triangular concave portions, and
    wherein each of the triangular concave portions is a triangle in which an outer side is short and an inner side is long.

8. The display device according to claim 7, wherein each of the triangular concave portions is a right-angled triangle.

9. The display device according to claim 8, wherein the triangular concave portions are periodically formed with a flat portion between them.

10. The display device according to claim 7, wherein each of the incident slits formed facing the green LED is an incident slit with a trapezoidal concave portion,
    wherein each of the saw tooth slits formed facing the red LED or the blue LED has a triangular concave portion, and wherein the triangular concave portion is a triangle in which an outer side is short and an inner side is long.

* * * * *